United States Patent [19]
Kishimoto et al.

[11] Patent Number: 5,442,331
[45] Date of Patent: Aug. 15, 1995

[54] METHOD AND DEVICE FOR DETECTING A DEFLATED TIRE BY COMPARING ANGULAR VELOCITY AND FORWARD/BACKWARD SPEED DATA WITH A DATA TABLE

[75] Inventors: Yoshikazu Kishimoto, Kakogawa; Minao Yanase, Kobe, both of Japan

[73] Assignee: Sumitomo Rubber Industries, Ltd., Kobe, Japan

[21] Appl. No.: 169,397

[22] Filed: Dec. 20, 1993

[30] Foreign Application Priority Data

Dec. 21, 1992 [JP] Japan .................. 4-340000
Dec. 24, 1992 [JP] Japan .................. 4-344104

[51] Int. Cl.⁶ ............................................ B60C 23/00
[52] U.S. Cl. .................................. 340/444; 73/146.2
[58] Field of Search ............. 340/444; 73/146.2, 146.3, 73/146.4, 146.5

[56] References Cited

U.S. PATENT DOCUMENTS 4,355,298 10/1982 Jessup ........................ 340/444
5,218,862 6/1993 Hurrell, II et al. ............ 340/444 X

FOREIGN PATENT DOCUMENTS 0291217 11/1988 European Pat. Off. .
0552827 7/1993 European Pat. Off. .
0554131 8/1993 European Pat. Off. .
2271063 5/1974 France .
63-305011 12/1988 Japan .
8711310 5/1987 United Kingdom .
2246461 1/1992 United Kingdom ............ 340/444

Primary Examiner—Richard E. Chilcot, Jr.
Assistant Examiner—Joseph L. Felber

[57] ABSTRACT

A method for detecting a deflated condition of a tire, comprises the steps of (a) detecting the angular velocity of each wheel, (b) producing a signal proportional to the angular velocity detected, (c) detecting acceleration of the vehicle in a forward or backward direction, (d) obtaining a speed of the vehicle in the forward or backward direction by integrating the detected acceleration, (e) producing a signal proportional to the obtained speed of the vehicle in the forward or backward direction, and (f) arithmetically processing the signals produced in steps (b) and (e). In step (f), the angular velocity of each wheel at the speed in the forward or backward direction obtained in step (d) is obtained from a normal wheel angular velocity table previously prepared; and the result is compared with the angular velocity detected in step (a), and if the difference therebetween is within the range of 0.05% to 0.60%, a device for warning of a deflated tire is operated.

8 Claims, 1 Drawing Sheet

METHOD AND DEVICE FOR DETECTING A DEFLATED TIRE BY COMPARING ANGULAR VELOCITY AND FORWARD/BACKWARD SPEED DATA WITH A DATA TABLE

BACKGROUND OF THE INVENTION

The present invention relates to a method and a device for detecting a deflated condition of a tire on a vehicle such as a car or a truck. More particularly, the invention relates to a method and a device capable of reducing cost by the use of wheel speed pulse in an ABS (Antiblock Breaking System) and of detecting simply and reliably simultaneous deflated condition of not less than two wheels at minimum increase of cost by installing an acceleration detector.

Pneumatic pressure of tires greatly influences the performance of vehicles, especially the deflation of tires has a close relation to safety for drivers. Hence, many systems for detecting a deflated condition of a tire have been proposed. However, these proposals could not realize both high reliability and low cost so that they have not been widely spread. Recently, with the spread of ABS, there has been proposed a system with low cost and high reliability wherein the wheel speed pulse in the ABS is utilized. Although the system is reliable regarding the a deflated condition of one tire, it is not reliable to simultaneous deflated condition of not less than two wheels.

In the meantime, the devices for detecting a deflated condition are classified into several types according to detection methods. One of the devices is of a type which directly detects pneumatic pressure of tires and the other is of a type which detects physical quantity such as deflation condition or revolution number which changes with pneumatic pressure.

The former is more reliable than the latter while the device is complicated and expensive because transmission of signals from a rotating body to a static section is difficult. On the other hand, the latter is simple and cheap while it is less reliable than the former.

Also, in the systems for detecting a deflated condition on the basis of wheel speed, a deflated condition of a tire is generally determined by the comparison between the wheel speed pulse of the deflated pneumatic tire and that of the normal pneumatic tire. Accordingly, the pneumatic pressure of at least one tire must be normal, so that the simultaneous deflated condition of four wheels cannot be detected theoretically.

In view of the above state of the art, it is an object of the present invention to provide a method and a device for detecting a deflated condition of a tire for which the cost is low and which has high reliability and can detect simultaneous deflated conditions of four wheels on a vehicle.

SUMMARY OF THE INVENTION

In accordance with the present invention, there is provided a method for detecting a deflated condition of a tire on a vehicle, the method comprising the steps of:
(a) detecting the angular velocity of each wheel,
(b) producing signals proportional to each of the detected angular velocities,
(c) detecting accelerations of the vehicle in a forward or backward direction,
(d) obtaining a speed in the forward or backward direction by integrating the detected accelerations,
(e) producing a signal proportional to the obtained speed in the forward or backward direction, and
(f) arithmetically processing the signals produced in steps (b), and (e)
wherein the step (f) comprises;
obtaining, from a table of wheel angular velocities under normal condition prepared previously, a wheel angular velocity at the speed in the forward or backward direction which is obtained in step (d),
comparing the wheel angular velocity at the speed in the forward or backward direction with the angular velocity of each wheel obtained in step (a), and
operating a device which warns of the deflated condition of a tire when the respective differences between the wheel angular velocity at the speed in the forward or backward direction and the angular velocity of each wheel detected in the step (a) ranges from 0.05% to 0.60% of wheel angular velocity in the table.

The method of the present invention preferably includes a step (g) of directly measuring and monitoring acceleration of the vehicle in a lateral direction, and a step (h) of invalidating the data of angular velocity of each wheel when an absolute value of the acceleration in the lateral direction exceeds 0.06 g (g: gravity).

Further, the method of the present invention preferably includes a step (i) of directly measuring and monitoring acceleration of a vehicle in a forward or backward direction, and a step (j) of invalidating the data of angular velocity of each wheel when an absolute value of the acceleration in the forward or backward direction exceeds 0.03 g.

Moreover, the method of the present invention preferably includes a step (k) of invalidating the data of angular velocity of each wheel when a braking pedal is stepped on; or a step (l) of measuring throttle opening and differentiating the measured value, and a step (m) of invalidating the data of angular velocity of each wheel when the differentiated value exceeds 100%/sec.

In accordance with the present invention, there is also provided a device for detecting deflated conditions of the tire on a vehicle comprising:
angular velocity detecting means for detecting an angular velocity of each wheel,
angular velocity signal producing means for producing signals proportional to the detected angular velocities,
acceleration detecting means for detecting accelerations of the vehicle in a forward or backward direction,
integrating means for integrating the detected acceleration and obtaining a speed in the forward or backward direction,
speed signal producing means for producing a signal proportional to the obtained speed in the forward or backward direction, and
arithmetic processing means for arithmetically processing the signals from the angular velocity signal producing means and the speed signal producing means,
wherein the arithmetic processing means
obtains, from a table of wheel angular velocities under normal condition prepared previously, a wheel angular velocity at the speed in the forward or backward direction which is obtained by the integrating means, compares the wheel angular velocity at the speed in the forward or backward direction with the angular velocity of each wheel obtained in the angular velocity detecting means, and operates a device which warns of the deflated condition of a tire when the respective differences the Speed in the between the wheel angular velocity at forward or backward direction and the angular velocity of each wheel obtained in the angular velocity detecting means range from 0.05% to 0.60% of wheel angular velocity of the table.

The device of the present invention preferably includes means for directly measuring and monitoring acceleration of the vehicle in the lateral direction, and means for invalidating the data of angular velocity of each wheel when an absolute value of the acceleration in the lateral direction exceeds 0.06 g (g: gravity).

Further, the device of the present invention preferably includes means for directly measuring and monitoring acceleration of the vehicle in the forward or backward direction, and invalidating the data of angular velocity of each wheel when an absolute value of the acceleration in the forward or backward direction exceeds 0.03 g.

Moreover the device of the present invention preferably includes means for invalidating the data of angular velocity of each wheel when a braking pedal is actuated or means for measuring throttle opening and differentiating and monitoring the measured value, and invalidating the data of angular velocity of each wheel when the differentiated value exceeds 100%/sec.

According to the present invention, acceleration of a vehicle is measured with a sensor, and an absolute speed of the vehicle is obtained by integrating the acceleration from the time the vehicle starts.

BRIEF DESCRIPTION OF THE DRAWING

FIG. 1 shows the elements: wheels 1, 2, 3, and 4; angular velocity detecting means 5; angular velocity signal producing means 6; acceleration detecting means 7; integration means 8; speed signal producing means 9; arithmetic processing means 10; warning device 11; lateral direction acceleration measuring means 12; forward or backward direction acceleration measuring means 13; braking pedal 14; and throttle opening measuring means 15.

DETAILED DESCRIPTION OF THE INVENTION

Figure 1:
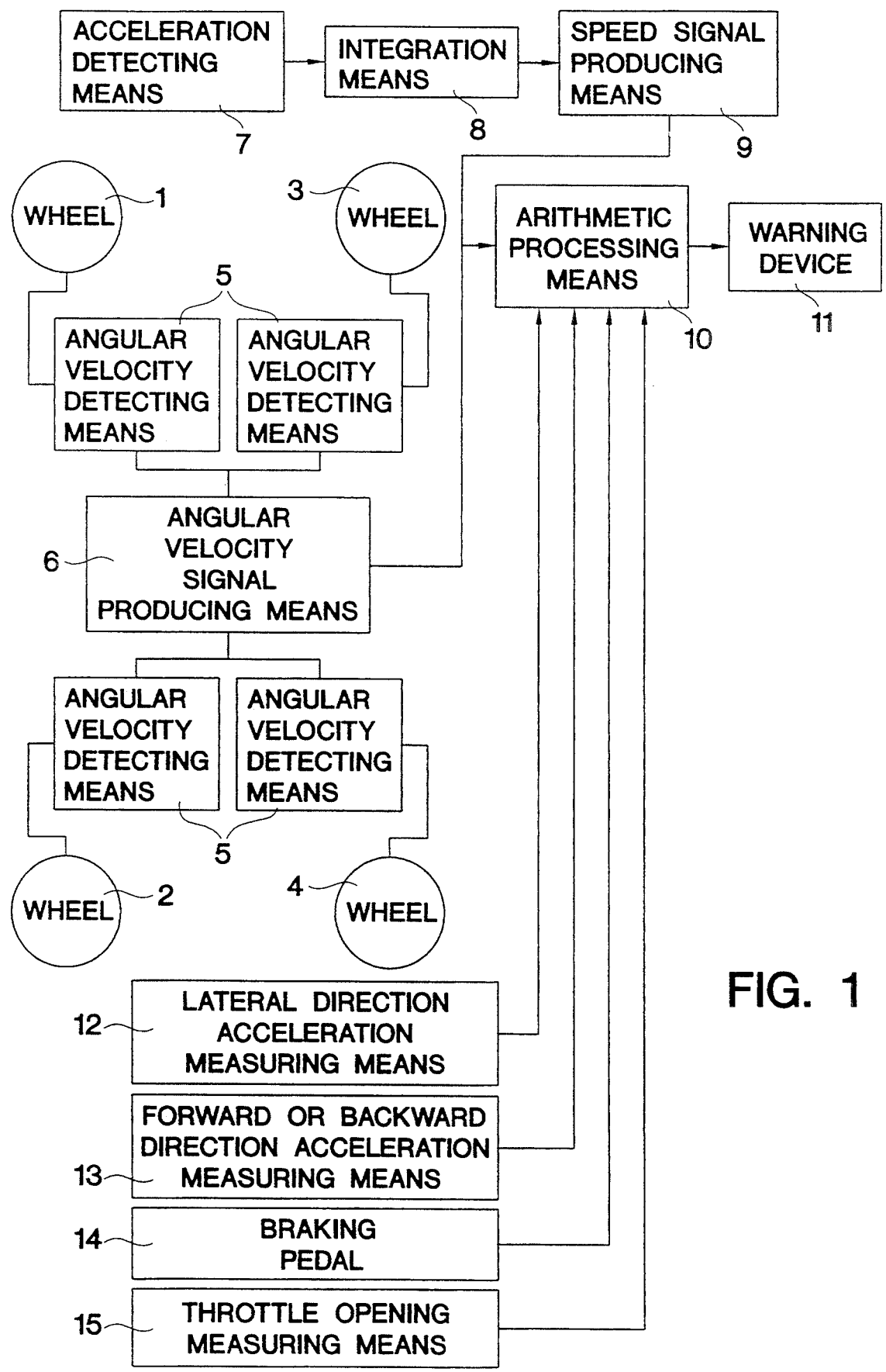
FIG. 1 is a schematic view of the inventive device for the detection of a deflated condition of a tire.

Described herebelow is a method for detecting pneumatic abnormalities of a tire on a vehicle according to the present invention (hereinafter referred to detection method) in each step.

In step (a), angular velocity of rotation (hereinafter referred to angular velocity) of each wheel 1, 2, 3, 4 is detected from vehicle speed pulses produced in an ABS by using angular velocity detecting means such as a pulse counter. In step (b), signals proportional to the angular velocities are produced by using angular velocity signal producing means 6 such as a digital-to-analog D/A converter, and the angular velocity of each wheel is always monitored.

In step (c), a voltage proportional to acceleration is monitored by using a acceleration sensor such as a piezo-electric acceleration transducer or a strain gauge acceleration transducer to obtain acceleration in a forward or backward direction. The acceleration is transmitted to an analog-to-digital (an A/D) converter through a filter and is digitized. Sampling is executed at regular intervals.

In step (d), the sampled, digitized accelerations are integrated from the time the vehicle starts by using integration means 8 such as an integration circuit, so that an absolute speed of the vehicle is obtained. The integration is executed by using, for example, trapezoidal integration. In step (e), a signal proportional to the absolute speed is produced by using speed signal producing means 9 such as a D/A converter, and the absolute speed of the vehicle is always monitored.

In step (f), an angular velocity under normal pneumatic pressure at the absolute speed of the vehicle obtained in step (d) is obtained from the table prepared previously and is compared with the angular velocity detected in step (a) by using an arithmetic processing means 10. The signals from steps (e) and (b) are used at this stage. The device 11 which warns of a deflated condition is operated when the difference between the two angular velocities ranges from 0.05% to 0.60% of the wheel angular velocity in the table. Warning can be performed by using buzzers and the like which appeal to ears or by using lamps and the like which appeal to eyes.

In step (f), a table describing angular velocities of each tire at each specific speed under normal pneumatic pressure is required. Such kind of tables can be obtained by driving on a straight course at each specific speed under normal pneumatic pressure. Table 1 shows an example of such tables.

TABLE 1

|  | 20 (km/h) | 40 (km/h) | 60 (km/h) | 80 (km/h) | 100 (km/h) | 120 (km/h) |
|---|---|---|---|---|---|---|
| Front left wheel | 8.8940 (rad/sec) | 17.7835 | 26.6692 | 35.5402 | 44.4018 | 53.2213 |
| Front right wheel | 8.9064 | 17.8083 | 26.7064 | 35.5897 | 44.4636 | 53.2955 |
| Rear left wheel | 8.8747 | 17.7437 | 26.6071 | 35.4534 | 44.2885 | 53.0786 |
| Rear right wheel | 8.8634 | 17.7211 | 26.5731 | 35.4083 | 44.2321 | 53.0109 |

Angular velocities of tires (that is, wheels) change with speeds of vehicles. Accordingly, angular velocity of each tire must be obtained at various driving speeds under normal pneumatic pressure and must be prepared in a table.

Also, the angular velocities of tires change with weight, turning of vehicles, wear, and braking, and driving besides the pneumatic pressure and the speed of the vehicles. If the device of the present invention further includes means for eliminating the above factors, such as means for judging whether a vehicle is turning or not, and means for judging whether a vehicle is on braking/driving status or not (refer to Japanese Unexamined Patent Publication No. 305011/1988), the accuracy of detection will, be improved.

Next, the method and the device of the present invention accompanied with such means is described.

In this method for eliminating abnormal values, the determination of turning and acceleration or deceleration of a vehicle is performed, not by calculating angular velocity of each tire, but by directly measuring accelerations of a vehicle in the lateral direction, transverse to a forward or backward direction of the vehicle, and in the forward or backward direction, whereby abnormal values can be surely eliminated.

In step (g), acceleration of a vehicle in the lateral direction is measured with a lateral acceleration sensor 12 mounted on a vehicle to be monitored with a microcomputer and the like. As a lateral acceleration sensor, for example, a piezo-electric acceleration transducer or a strain gauge acceleration transducer and the like can be used. These sensors can directly measure the acceleration of the vehicle in the lateral direction without using information from tire such as angular velocity of each tire. Hence, the acceleration in the lateral direction can be measured accurately, irrelevant to the status of the tires.

On the other hand, angular velocity of each tire is measured with a rotation pulse generator and the like to be always monitored with a microcomputer and the like.

In the (h), the data of angular velocity of each wheel is automatically eliminated by using a microcomputer and the like when the acceleration in the lateral direction exceeds 0.06 g so that deflation of tires are detected by using the data which are not eliminated. When the acceleration in the lateral direction exceeds 0.06 g, the obtained data cannot be used because a cause except deflation of tire, that is, turning of the vehicle makes differences in angular velocity between the inner wheel and the outer wheel, which in turn makes a warning device operate erroneously.

Instead of acceleration in the lateral direction, it is also preferable that, in a step (i), acceleration of a vehicle in a forward or backward direction is measured with a forward-backward acceleration measuring means 13 mounted on a vehicle and is always monitored with a microcomputer and the like in step (i). As a forward-backward acceleration means, for example, a piezoelectric acceleration transducer or strain gauge acceleration transducer can be used. These sensors can directly measure acceleration of a vehicle in the forward or backward direction without using information from tires such as, angular velocity of tire. Hence, the acceleration in the forward or backward direction can be measured accurately, irrelevant to the status of the tires.

Then, in step (j), the data of angular velocity of each wheel is automatically eliminated by using a microcomputer and the like when the acceleration in the forward or backward direction exceeds 0.03 g so that deflation of the tires are detected by using the data which are not eliminated. When the acceleration in the forward or backward direction exceeds 0.03 g, the obtained data cannot be used because, causes except deflation of tire, that is, tire slips caused by driving or braking make differences among the angular velocities of the tires.

Further, in step (k), it is preferable that the data of angular velocity of each wheel is automatically eliminated by using a microcomputer and the like when a braking pedal 14 is actuated. When the braking pedal is stepped on, the obtained data cannot be used because tire slip caused by braking makes differences among the angular velocities of the tires.

Also, as another method, in a step (l), throttle opening is measured with a throttle opening measuring means 15 such as a throttle. The measured value is differentiated by using a differentiating circuit, a microcomputer and the like and is always monitored with a microcomputer and the like. Then, in a step (m), when a differentiated value exceeds 100%/sec, it is preferable that the data of angular velocity of each tire are automatically eliminated by using a microcomputer and the like. When the differentiated value exceeds 100%/sec., the obtained data cannot be used because tire slip makes a difference among the angular velocities of tires, which makes the warning device operate wrongly.

Besides by using the above ways individually, it is preferable to adequately combine two or three ways among the above ways, and also preferable to use all the four ways. Thus, the abnormal values can be eliminated more accurately than by using the ways individually.

The detection method of the present invention utilizes wheel pulses in the ABS so that the reliability of the method rises and cost of the method are decreased. Acceleration measured by an acceleration sensor is integrated to obtain a vehicle speed. Deflation of tires are detected on the basis of the vehicle speed, hence simultaneous deflation of four wheels can be detected.

Though several embodiments of the present invention are described above, it is to be understood that the present invention is not limited only to the above-mentioned and various changes and modifications may be made in the invention without departing from the spirit and scope thereof.

What we claim is:

1. A method for detecting a deflation condition of a tire mounted on a wheel of a vehicle, comprising the steps of:
    (a) detecting angular velocity of each wheel,
    (b) producing signals proportional to the detected angular velocities,
    (c) detecting accelerations of the vehicle in a forward or backward direction,
    (d) obtaining a speed in the forward or backward direction by integrating the detected accelerations,
    (e) producing a signal proportional to the obtained speed in the forward or backward direction,
    (f) arithmetically processing the signals produced in steps (b) and (e),
    (g) measuring throttle opening, as a proportion of maximum opening differentiating the measured values with respect to tire and monitoring the differentiated values of throttle opening; and
    (h) invalidating the data of angular velocity of each wheel when the differentiated value of throttle opening exceeds 100%/sec,
    wherein the step (f) comprises;
        obtaining, from a previously prepared table of wheel angular velocities under normal conditions, a wheel angular velocity at the speed in the forward or backward direction which is obtained in step (d),
        comparing the wheel angular velocity at the speed in the forward or backward direction with the angular velocity of each wheel obtained in the step (a), and
        operating a device which warns of the deflation condition of the at least one tire when the respective differences between the wheel angular velocity at the speed in the forward or backward direction and the angular velocity of each wheel detected in the step (a) range from 0.05% to 0.60% of wheel angular velocity in the table.

2. The method of claim 1, further comprising the steps of:
    (i) directly measuring and monitoring acceleration in a lateral direction, said lateral direction being transverse to the forward and backward directions, and (j) invalidating the data of angular velocity of each wheel when an absolute value of the acceleration in the lateral direction exceeds 0.06 g.

3. The method of claim 1, further comprising the steps of:

(k) directly measuring and monitoring acceleration of the vehicle in the forward or backward direction, and (l) invalidating the data of angular velocity of each wheel when an absolute value of the acceleration, in the forward or backward direction exceeds 0.03 g.

4. The method of claim 1, further comprising the steps of:

(m) invalidating the data of angular velocity of each wheel when a braking pedal is actuated.

5. A device for detecting a deflation condition of a tire mounted on a wheel of a vehicle comprising:

angular velocity detecting means for detecting an angular velocity of each wheel, angular velocity signal producing means for producing signals proportional to the detected angular velocities, acceleration detecting means for detecting accelerations of the vehicle in a forward or backward direction, integrating means for integrating the detected acceleration and obtaining a speed in the forward or backward directions, speed signal producing means for producing a signal proportional to the obtained speed in the forward or backward direction, arithmetically processing means for arithmetic processing the signals from the angular velocity signal producing means and the speed signal producing means, means for measuring throttle opening as a proportion of maximum opening, differentiating the measured value, and monitoring the differentiated value, and means for invalidating the data of angular velocity of each wheel when the differentiated value of throttle opening exceeds 100%/sec, wherein the arithmetic processing means obtains, from a table of wheel angular velocities in normal condition, which is prepared previously, a wheel angular velocity at the speed in the forward or backward direction which is obtained by the integrating means, compares the wheel angular velocity at the speed in the forward or backward direction with the angular velocity of each wheel obtained in the angular velocity detecting means, and operates a device which warns of the deflation condition of the at least one tire when the respective difference between the wheel angular velocity at the speed in the forward or backward direction and the angular velocity of each wheel detected in the angular velocity detecting means range from 0.05% to 0.60% of wheel angular velocity in the table.

6. The device of claim 5, further comprising:

means for directly measuring and monitoring acceleration of the vehicle in a lateral direction, said lateral direction being transverse to the forward and backward directions, and means for invalidating the data of angular velocity of each wheel when an absolute value of the acceleration in the lateral direction exceeds 0.06 g.

7. The device of claim 5, further comprises:

means for directly measuring and monitoring acceleration of a vehicle in the forward or backward direction, and means for invalidating the data of angular velocity of each wheel when an absolute value of the acceleration in the forward or backward direction exceeds 0.03 g.

8. The device of claim 5, further comprises:

means for invalidating the data of angular velocity of each wheel a braking pedal is actuated.

* * * * *